Feb. 19, 1957   W. R. DAVIS ET AL   2,782,273
SINGLE-POLE, MULTI-CONTACT MERCURY JET SWITCH
Filed June 7, 1955   2 Sheets-Sheet 1

INVENTORS
WILLIAM R. DAVIS
JAMES H. DEERY
BY Mellin and Hanscom
ATTORNEYS

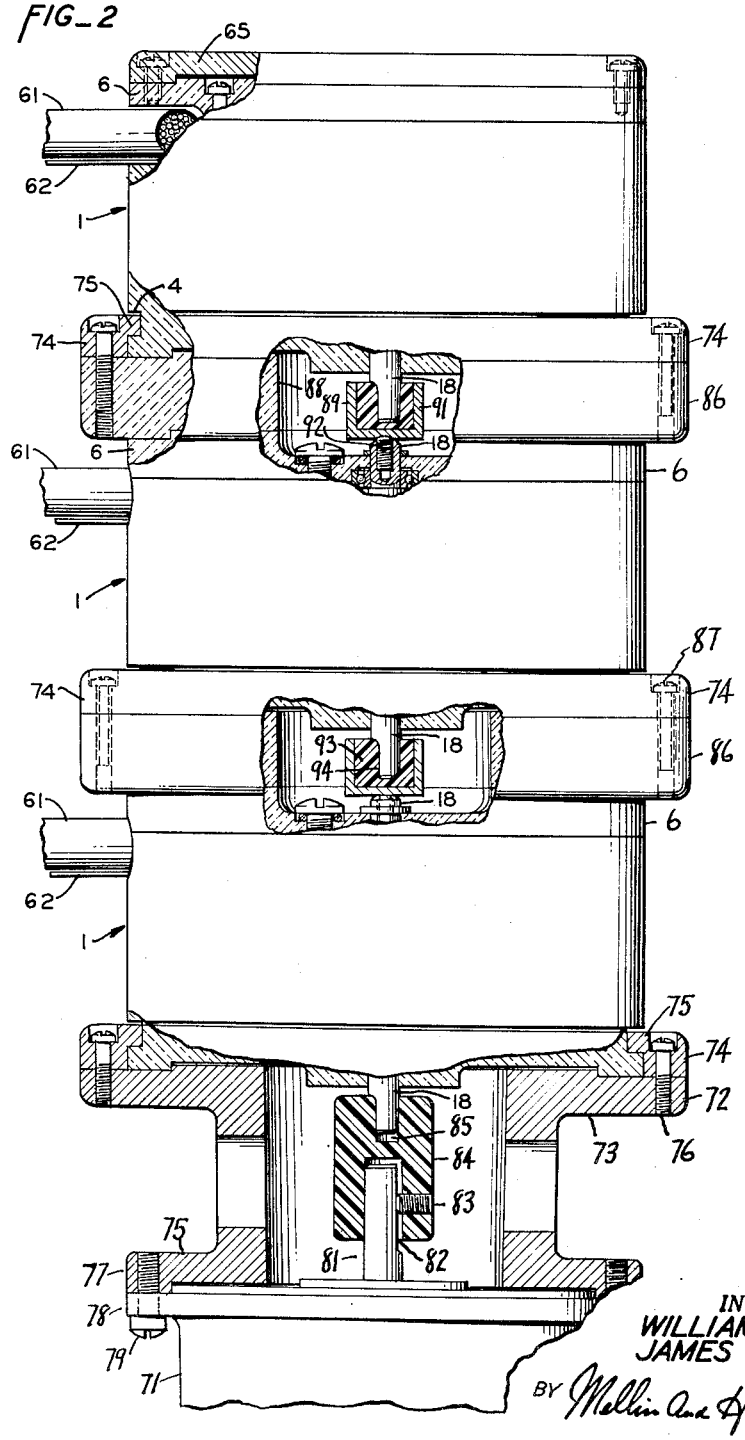

United States Patent Office 2,782,273
Patented Feb. 19, 1957

2,782,273

SINGLE-POLE, MULTI-CONTACT MERCURY JET SWITCH

William R. Davis and James H. Deery, Redwood City, Calif., assignors to Detroit Controls Corporation, Detroit, Mich., a corporation of Michigan Application June 7, 1955, Serial No. 513,704

7 Claims. (Cl. 200—32)

This invention relates to and in general has for its object the provision of a high-speed, single-pole, multi-contact mercury jet switch suitable for use in fields such as telemetering, communications, data reduction, and digital computors.

More specifically, the object of this invention is the provision of a rotary mercury jet switch for sequentially establishing a low-impedance, low-noise level contact with a plurality of terminals or contact points at speeds up to at least 12,000 R. P. M.

Another object of this invention is the provision of a mercury jet switch of simplified construction comprising: a bowl provided at its bottom with a central, annular mercury supply well surrounded at its upper end with an annular mercury return sump; a ring of peripherally spaced contact terminals extending through said bowl substantially above the level of said sump; a rotor mounted within said bowl coaxially therewith and provided with a nozzle having an orifice directed toward said ring of contact terminals; a centrifugal pump provided on said rotor for pumping a continuous stream of mercury from said well through said nozzle, into contact successively with said terminals and thence to said mercury return sump; and means for establishing electrical communication between mercury contained within the bottom of said bowl and a point external thereto.

Still another object of this invention is the provision of a switch of the character above described wherein the surfaces thereof with which the mercury has a moving but unsubmerged contact are relatively rough so as thereby to more readily and promptly discharge any static charges built up thereon.

A further object of this invention is the provision of a switch of the character above described wherein a perforated plate extends across said well chordwise thereby to restrain the mercury contained in said well from forming a cavity about the pump intake.

Still another object of this invention is the provision in a switch of the character above described wherein the sump walls are coated with a polished film of acrylic plastic having an affinity for the products of oxidation of mercury or mercury scum.

Another object of this invention is the provision of a switch of the character above described wherein said centrifugal pump is in the form of an upwardly diverging annular chamber provided at its intake with a pair of diametrically opposed scoops disposed within the confines of said well.

A further object of this invention is the provision of a switch of the character above described enclosed in another casing, wherein the rotor shaft is journaled in bearings mounted in the ends of said casing with one end of said shaft extending through one end of the casing and wherein two or more of such switch units can be stacked and coupled in tandem so as to provide a multiple-pole switch driven in unison from a common shaft and the various units of which can be brought into the desired phase relation with each other.

In the drawings, one form of the invention is shown, but it is to be understood that it is not limited to such form, since the invention as set forth in the claims may be embodied in other forms.

Referring to the drawings:

Fig. 2 is an elevation view of a number of switches of the type illustrated in Fig. 1 shown stacked and coupled in tandem so as to be driven from a common drive shaft to thereby form a multiple pole switch.

Figure 1:
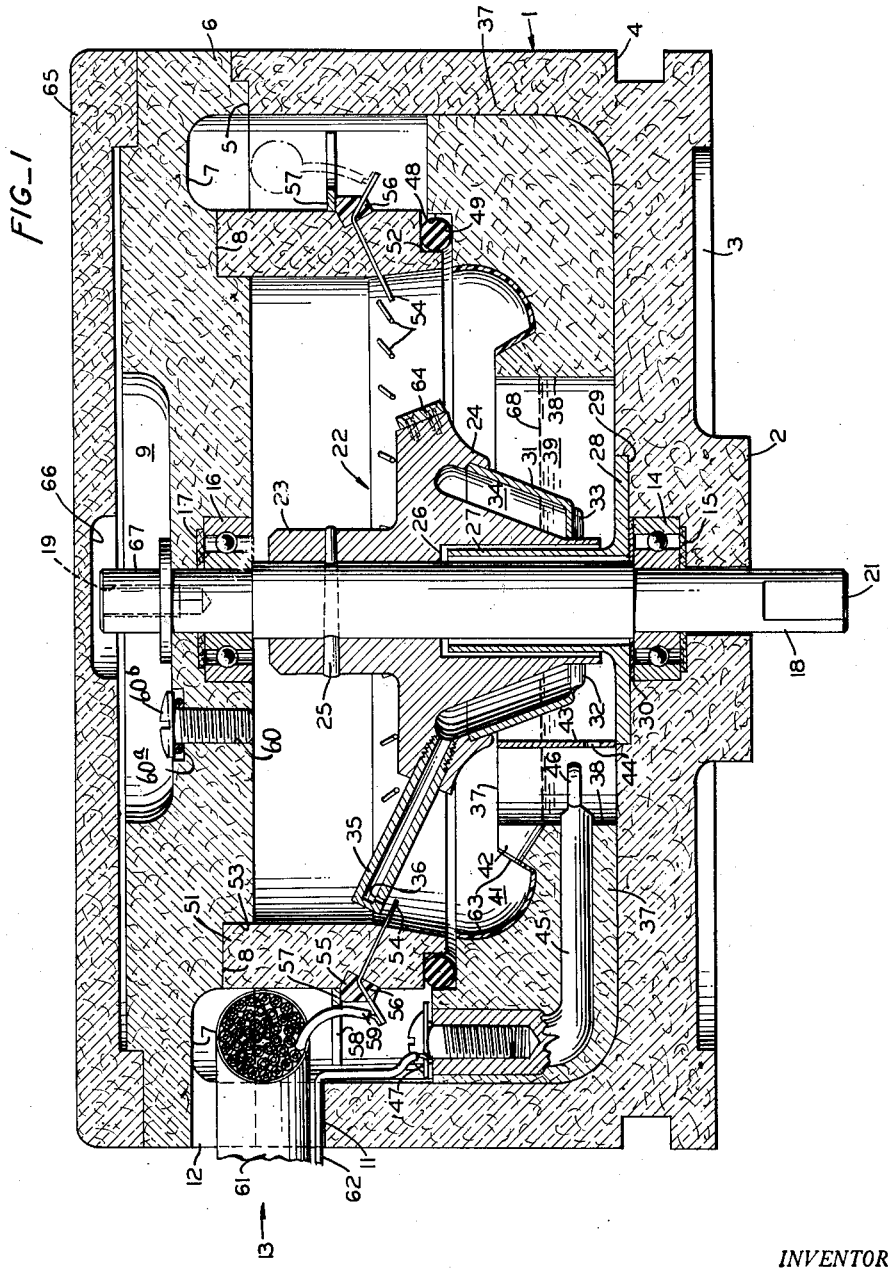
Fig. 1 is a vertical mid-section taken through a rotary jet switch embodying the objects of this invention.

The switch illustrated in Fig. 1 comprises a cup-shaped casing or switch body 1, provided at its lower end with a central boss 2 and with an annular recess 3. Extending into the lower side wall of the casing 1 is an annular channel 4 which, as will be later described, serves to receive clamps for connecting two such switches in tandem. Formed in the upper end of the wall of the casing 1 is a step 5 and closing the upper end of the casing is a complementary top plate 6. Extending around the under side of the plate 6 is an arched channel 7 merging with a step 8 and provided on the upper face of the plate 6 is a central dished recess 9. Formed in the upper end of the casing 1 and in the top plate 6 are mating notches or cutouts 11 and 12, together forming a closed passageway generally indicated by the reference numeral 13.

Mounted in the bottom of the casing 1 coaxially therewith is a bearing 14 seated on gasket ring 15 and mounted in the top plate 6 is a bearing 16 in axial alignment with the bearing 14 and backed by a gasket ring 17.

Journaled in the bearings 14 and 16 is a rotor shaft 18 internally threaded at its upper end as at 19 and formed at its lower protruding end with a coupling flat 21. Mounted on the shaft 18 is a rotor generally designated by the reference numeral 22 generally of inverted conical shape and including a hub 23 and an overhanging wall portion 24. Extending through the hub 23 and shaft 18 is a tapered connecting pin 25 serving to rigidly fix these two members together. Formed in the rotor body is an upwardly extending, axial cylindrical bore 26 having substantial clearance with the shaft 18. Surrounding the shaft 18 within the confines of the bore 26 and having positive clearance with both the shaft and the walls of the bore is a sleeve 27 formed at its lower end with an annular flange or foot 28 seated within a circular recess 29 formed in the floor of the casing 1. Disposed between the flange 28 and the upper face of the bearing 14 is an annular gasket 30. As a result of this construction, the sleeve 27 forms a labyrinth about the shaft 18, the purpose of which will be later described.

Fixed to the overhanging wall portion 24 of the rotor 22 is an upwardly diverging annular ring 31 provided at its lower end with a pair of diametrically opposed scoops 32 and 33 and defining with the conical walls of the rotor body an annular upwardly diverging passageway or chamber 34. Threaded into the upper peripheral side wall of the rotor 22 and having communication with the upper end of the annular passageway 34 is an inclined, radially extending nozzle 35 formed with a downwardly and outwardly directed orifice 36.

Snugly accommodated within the bottom of the casing 1 and affixed thereto in any suitable manner is an annular switch body portion 37 having an interior cylindrical wall 38 defining with the sleeve 27 an annular mercury supply well 39, and formed with an annular channel or mercury return sump 41 disposed above the level of the well 39 but communicating therewith through radial notches 42 formed in the cylindrical wall 38. Extending across the well 39 chordwise is a vertically disposed barrier plate 43 provided with perforations 44. Molded in the switch body portion is a conductor 45 having a lower end 46 extending into the pool 39 and serving as a mercury pool contactor and provided at its upper end with a terminal 47.

Seated on the upper end of the switch body portion 37 within a shoulder 48 formed therein is an O sealing ring 49 and seated in sealing engagement with the O ring 49 is an annular stator ring 51 provided with an annular recess 52 for accommodating the O ring and holding it in place. Accommodating the upper end of the stator ring 51 is a recess 53 formed in the lower face of the top plate 6. It should be noted that the stator ring 51 and the switch body portion 37 together form what may be termed a two-part bowl wherein the central portion of the bottom of the casing 1 serves as the bottom of the bowl and wherein the bowl is provided with a central mercury supply well 39 and with a circumscribing mercury return sump 41.

Inserted through the stator ring 51 are a plurality of peripherally spaced, radially extending contact pins 54, the inner ends of these pins being disposed immediately beneath the locus of the orifice 36. Sealed about the outer ends of the pins 54 and within an annular channel 55 formed in the stator ring 51 is a ring of resin 56 or other suitable dielectric sealing material.

Secured to and around the stator 51 in any suitable manner is a fanning ring 57 provided on its outer periphery with notches 58 each for receiving a connecting wire 59 from one of the pins 54 and for holding such wires in line with the passageway 13. Conventionally, the wires can be assembled into a common cable 61. Fastened to the terminal 47 which serves as the common leg or pole of the switch is a lead 62 which also passes outwardly through the passageway 13.

Preferably, film or coating 63 of a polished acrylic plastic or the like is applied to the sump 41, a coating such as this having been found to have an affinity for the products of oxidation of the mercury which may be formed. The remaining interior surfaces of the switch exposed to mercury are made relatively rough such as a medium rough sand-blasted surface. As above stated, this is done so as to readily dissipate any static charges which might form thereon and thereby avoid heavier discharges which would result in a material increase in the noise level.

To balance the rotor 22 and compensate for the weight of the nozzle 35, a weight 64 is fixed to the rotor diametrically opposite the nozzle.

Removably secured to and over the top plate 6 is a cover-plate 65 provided with a central interior recess 66 for accommodating the upper protruding end 67 of the shaft 18.

Preferably, the rotor shaft 18, scoops 32 and 33, the barrier strip 43, contactor 45, contact pins 54, nozzle 35, rotor 22, pin 25, sleeve 27 and its flange 28, and the rotor ring 31 are made of stainless steel and the casing parts of fabric reinforced phenolic or glass filled resin.

Extending through the plate 6 within the confines of recess 9 is a threaded filling hole 60 for the introduction of mercury into the switch. Seated over the upper end of the hole 60 is a gasket 60a and sealed thereon and threaded in the hole 60 is a closure screw 60b.

Accommodated within the central well 39 and the sump 41 is a body of mercury indicated by the level line 68 and which forms an operating element of the switch.

During the operation of the switch as above described, the centrifugal pump delivers a continuous stream of mercury through the rotating orifice 36 successively to each of the contact pins 54 (there being in the order of 120 such pins) and from the pins the mercury drops into the sump 41 and is returned to the well 39 through the notches 42. Any tendency of the mercury within the well 39 to form a vortex about the pump scoops 31 and 32 is restrained by the perforated barrier 43, and since the only communication between the well 39 and the sump 41 is by way of the radial notches 42, no movement of the mercury within the well is imparted to the mercury within the sump. Any products of oxidation of the mercury formed during the operation of the switch adhere to the coated walls of the sump or float on top of the body of mercury contained within the sump or the well, and since the intake of the pump is at the middle of the well, clean mercury is always delivered to the nozzle 35, thus precluding plugging thereof and of its orifice 36.

As illustrated in Fig. 2, a switch of the character above described can be coupled to an electric motor 71 by seating the base of the switch body 1 on the flange 72 of a cylindrical adapter 73 and adjustably clamping it thereby by a locking ring 74. Formed on the ring 74 is an inwardly extending annular flange 75 receivable in the channel 4, the ring 74 being connected to the flange 72 by countersunk screws 76.

Provided on the lower end of the adapter 73 is a flange 77 arranged to seat on the flange 78 of the motor 71, and threaded through these two flanges are screws 79.

Extending upwardly from the motor 71 is a drive shaft 81 formed with a flat 82 and mounted on the shaft and secured thereto by a set screw 83 is a coupling 84. Moulded in the upper end of the coupling 84 is a polygonal socket 85 of a contour arranged to mate with the shaft 18.

Also as illustrated in Fig. 2, two or more switch units can be coaxially stacked for the purpose of producing a multi-pole switch, each capable of being adjusted in any desired phase relationship with the other and with the motor 71. Assuming that three units are to be stacked, the coverplates 65 of the lower and intermediate units are first removed and a stacking adapter 86 is substituted for each of them. Secured to each stacking adapter 86 by screws 87 is a locking ring 74 which as above described is provided with an inwardly extending annular flange 75 receivable in the channel 4 formed in the body 1 of each of the switch units. Formed in each of the adapters 86 is a central opening 88 and accommodated therein is a coupling member 89. Each of the couplings 89 includes a cup 91 provided with a depending stem 92 threaded into the upper end of the shaft 67 of the adjacent switch unit. Moulded within each cup 89 is a body 93 of epoxy resin formed with a polygonal recess 94 conforming to the contour of and mating with the lower end of the contiguous shaft 18.

As a result of this construction, any number of switch units can be stacked in tandem and by simply loosening the screws 87, each unit can be rotated relative to the adjacent unit or motor to bring them into any desired phase relationship.

We claim:

1. A rotary jet switch comprising: a bowl provided at its bottom with a central mercury supply well surrounded at its upper end by an annular mercury return sump, the surfaces of said sump being polished; a ring of peripherally spaced contact pins mounted on and within said bowl substantially above the level of said sump; a rotor mounted within said bowl coaxially therewith and provided with a nozzle having an orifice directed toward said ring of contact pins; a centrifugal pump provided on said rotor for pumping a stream of mercury from said well through said nozzle and on to said contact pins; and means for establishing electrical communication between mercury contained within the bottom of said bowl and a point external thereto.

2. A rotary jet switch comprising: a bowl provided at its bottom with a central mercury supply well surrounded at its upper end by an annular mercury return sump, the surfaces of said sump being coated with a polished plastic having an affinity for mercury sump; a ring of peripherally spaced contact pins mounted on and within said bowl substantially above the level of said sump; a rotor mounted within said bowl coaxially therewith and provided with a nozzle having an orifice directed toward said ring of contact pins; a centrifugal pump provided on said rotor for pumping a stream of mercury from said well through said nozzle and on to said contact pins; and means for establishing electrical communication between mercury contained within the bottom of said bowl and a point external thereto.

3. A rotary jet switch comprising: a bowl provided at its bottom with a central mercury supply well surrounded at its upper end by an annular mercury return sump, the surfaces of said sump being polished; a ring of peripherally spaced contact pins mounted on and within said bowl substantially above the level of said sump; a rotor mounted within said bowl coaxially therewith and provided with a nozzle having an orifice directed toward said ring of contact pins; a centrifugal pump provided on said rotor for pumping a stream of mercury from said well through said nozzle and on to said contact pins; means for establishing electrical communication between mercury contained within the bottom of said bowl and a point external thereto, and a perforated barrier plate extending across said well chordwise thereof.

4. A rotary jet switch comprising: a bowl including a bottom portion formed with a central mercury retaining well surrounded at its upper end by an annular mercury receiving sump and including an annular side wall portion mounted on said bottom portion and sealed thereto, the surfaces of said sump being polished; a ring of peripherally spaced contact pins extending through said annular side wall portion; a rotor mounted in said bowl coaxially therewith and provided with a nozzle having a discharge orifice located in line with said contact pins and with a centrifugal pump for pumping mercury from said well through said nozzle into successive engagement with said contact pins; and means for establishing electrical communication between mercury contained in said bowl and a point external thereto.

5. A rotary jet switch comprising: a bowl including a bottom portion formed with a central mercury retaining well surrounded at its upper end with an annular mercury receiving sump and including an annular side wall portion mounted on said bottom portion and sealed thereto, the outer face of said annular side wall portion being inwardly stepped from the outer face of the peripheral edge of said bottom portion; a ring of peripherally spaced contact pins extending through said annular side wall portion; a rotor mounted in said bowl coaxially therewith and provided with a nozzle having a discharge orifice located in line with said contact pins and with a centrifugal pump for pumping mercury from said well through said nozzle into successive engagement with said contact pins; said bowl being surrounded by an outer casing having a bottom constituting the bottom of said well, the stepped portion of said annular wall and the surrounding portion of said casing together defining a channel for the reception of the outer ends of said contact pins; and means for establishing electrical communication between mercury contained in said bowl and a point external thereto.

6. A rotary jet switch comprising: a bowl provided at its bottom with a central mercury supply well surrounded at its upper end by an annular mercury return sump; a ring of peripherally spaced contact pins mounted on and within said bowl substantially above the level of said sump; a top plate hermetically sealed over and to the top of said bowl, said plate being formed on its upper face with a central recess; a shaft journaled in and extending through both the bottom of said bowl and said plate; a rotor secured to said shaft within said bowl, said rotor being provided with a nozzle having an orifice directed toward said ring of contact pins; a centrifugal pump provided on said rotor for pumping a stream of mercury from said well through said nozzle and to said contact pins; and means for establishing electrical communication between mercury contained within the bottom of said bowl and a point external thereto.

7. A plurality of stacked switches such as defined in claim 6, wherein the contiguous ends of the shafts of each adjacent pair of switches are coupled together so that said switches can be driven in unison as a multiple pole switch.

References Cited in the file of this patent

UNITED STATES PATENTS

| | | |
|---|---|---|
| 625,921 | Boas | May 30, 1899 |
| 2,444,687 | Widakowich | July 6, 1948 |
| 2,609,461 | Holcomb et al. | Sept. 2, 1952 |